United States Patent
Parker et al.

(10) Patent No.: US 8,854,278 B2
(45) Date of Patent: Oct. 7, 2014

(54) DISPLAY APPARATUS

(75) Inventors: Jeffrey C. Parker, Magnolia, TX (US);
Victor A. Corrin, Cypress, TX (US);
Scott T. Ogle, Spring, TX (US); David W. Cawthon, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2372 days.

(21) Appl. No.: 10/742,365

(22) Filed: Dec. 19, 2003

(65) Prior Publication Data

US 2005/0134524 A1 Jun. 23, 2005

(51) Int. Cl.
*G09G 5/00* (2006.01)
*G06F 3/14* (2006.01)

(52) U.S. Cl.
CPC ............ *G06F 3/1431* (2013.01); *G06F 3/1438* (2013.01)
USPC .............................. 345/1.1; 361/681; 348/794

(58) Field of Classification Search
USPC ....................... 345/1.1, 1.3; 361/681; 348/794
See application file for complete search history.

(56) References Cited

U.S. PATENT DOCUMENTS

| | | | |
|---|---|---|---|
| 5,278,779 A * | 1/1994 | Conway et al. | 361/679.16 |
| 5,768,096 A | 6/1998 | Williams et al. | |
| 5,847,698 A | 12/1998 | Reavey et al. | |
| 5,949,643 A | 9/1999 | Batio | |
| 6,081,207 A | 6/2000 | Batio | |
| 6,222,507 B1 * | 4/2001 | Gouko | 345/1.1 |
| 6,295,038 B1 * | 9/2001 | Rebeske | 345/1.1 |
| 6,343,006 B1 | 1/2002 | Moscovitch et al. | |
| 6,532,146 B1 | 3/2003 | Duquette | |
| 6,859,219 B1 * | 2/2005 | Sall | 345/1.1 |
| 6,967,632 B1 * | 11/2005 | Minami et al. | 345/1.3 |
| 2003/0034951 A1 * | 2/2003 | Fry et al. | 345/156 |
| 2003/0043087 A1 * | 3/2003 | Kim | 345/1.1 |
| 2003/0160735 A1 * | 8/2003 | Lee et al. | 345/4 |
| 2004/0046704 A1 * | 3/2004 | Kim | 345/1.1 |

FOREIGN PATENT DOCUMENTS

WO    WO 02054208 A1 *  7/2002

* cited by examiner

*Primary Examiner* — Seokyun Moon

(57) ABSTRACT

A method and apparatus for a display comprising a first display comprising a base and a first side extending from the base. The apparatus also comprises a second display comprising a first side coupled to the first side of the first display. The displays have a first position, wherein the first side of the first display is aligned with the first side of the second display, and a second position, wherein the first side of the first display is oblique to the first side of the second display.

12 Claims, 8 Drawing Sheets

DISPLAY APPARATUS

BACKGROUND

Many computer applications are enhanced by the simultaneous use of multiple display screens. Integrating multiple display screens into a portable computer system, such as a notebook personal computer, creates many technological challenges in both packaging and operating the system. For example, integrating multiple screens into a single portable package creates technological challenges in how to store and mechanically support the screens. Supplying video signals and power to the multiple screens also adds design challenges.

SUMMARY

One embodiment of a display apparatus comprising a first display that comprises a base and a first side extending from the base. The apparatus also comprises a second display comprising a first side coupled to the first side of the first display. The displays have a first position, wherein the first side of the first display is aligned with the first side of the second display, and a second position, wherein the first side of the first display is oblique to the first side of the second display.

BRIEF DESCRIPTION OF THE DRAWINGS

For a detailed description of certain embodiments of the invention, reference will now be made to the accompanying drawings in which.

DETAILED DESCRIPTION

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the verb "couple" or "couples" is intended to mean either an indirect or direct connection. Thus, if a first device couples to a second device, that connection may be through a direct connection, or through an indirect connection via other devices and connections. A display is intended to describe a computer output screen and projection apparatus that shows text and graphic images to the computer user. A display may comprise a liquid crystal display (LCD), light-emitting diode (LED), gas plasma, cathode ray tube (CRT), or other display technology. The display also comprises the housing or structure that supports the screen and projection apparatus.

Figure 1:
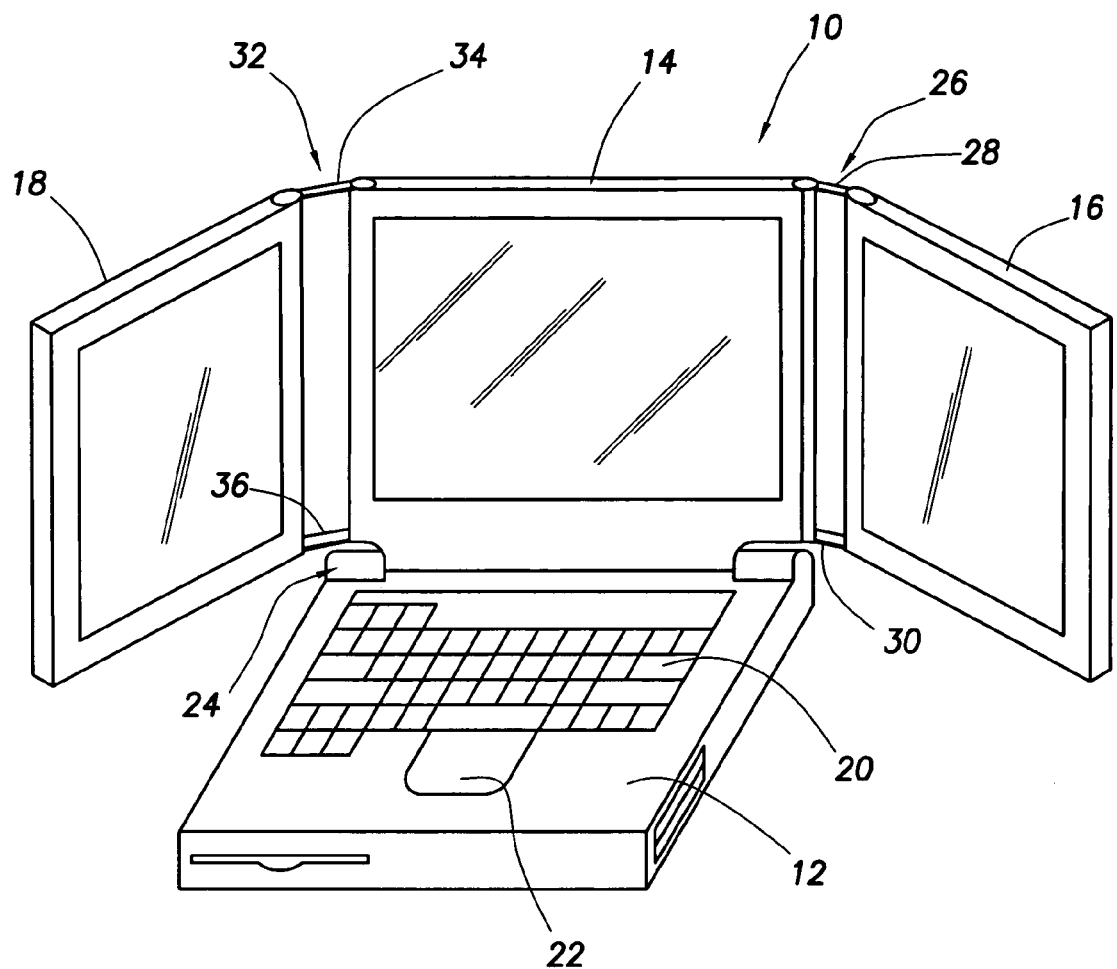
FIG. 1 illustrates a portable computer system in accordance with embodiments of the invention.

Referring to FIG. 1, a portable computer system 10 comprising main chassis 12, center display 14, first adjoining display 16, and second adjoining display 18. Chassis 12 comprises components for operating a portable computer system such as, for example, a processor, memory, power supplies, disc drives, communications equipment, input/output connections, display controllers, and input devices such as keyboard 20 and touch pad 22. Center display 14 is connected to chassis 12 by hinge 24. First adjoining display 16 is connected to center display 14 by hinge assembly 26, which comprises an upper hinge 28 and a lower hinge 30. Second adjoining display 18 is connected to center display 14 by hinge assembly 32, which comprises an upper hinge 34 and a lower hinge 36.

Figure 2:
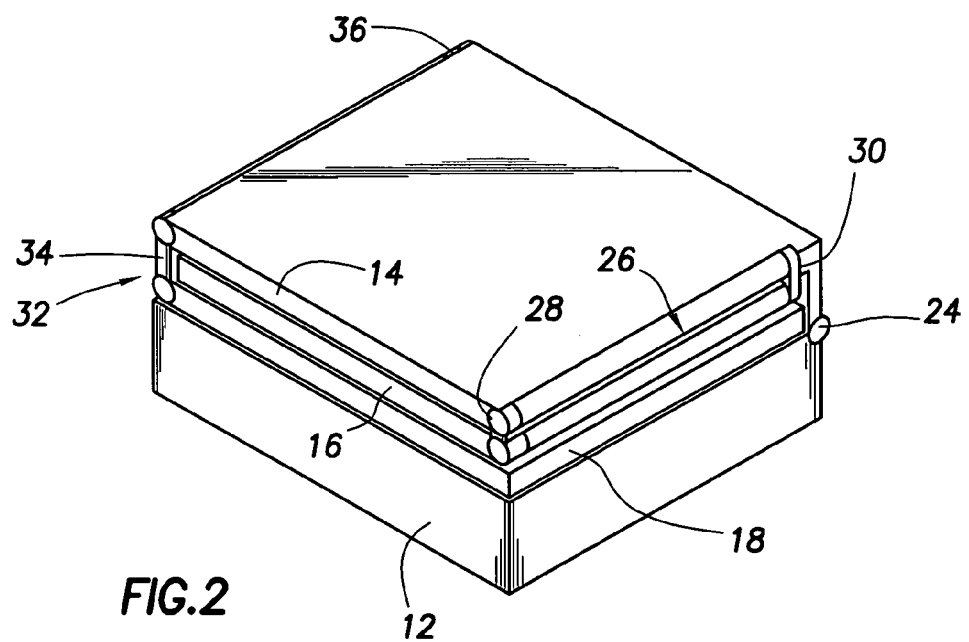
FIG. 2 illustrates a front view of a portable computer system in a collapsed position in accordance with embodiments of the invention.

Referring now to FIG. 2, computer system 10 is shown in a collapsed position. First adjoining display 16 is coupled to center display 14 by hinge assembly 26 and has a stored position that is substantially against center display 14. Second adjoining display 18, which is coupled to center display 14 by hinge assembly 32, has a stored position that substantially against first adjoining display 16. Thus, hinge assembly 32 is longer or wider than hinge assembly 26 in order to accommodate first adjoining display 16 being stored between second adjoining display 18 and center display 14. Center display 14 coupled to chassis 12 by hinge 24, which enables second adjoining display 18 to be stored in a position substantially against chassis 12. In an alternative embodiment, the positions of first adjoining display 16 and second adjoining display 18 could be interchanged such that the second adjoining display is stored between the first adjoining display and the center display and the storage position of the first adjoining display is against chassis 12.

Figure 3:
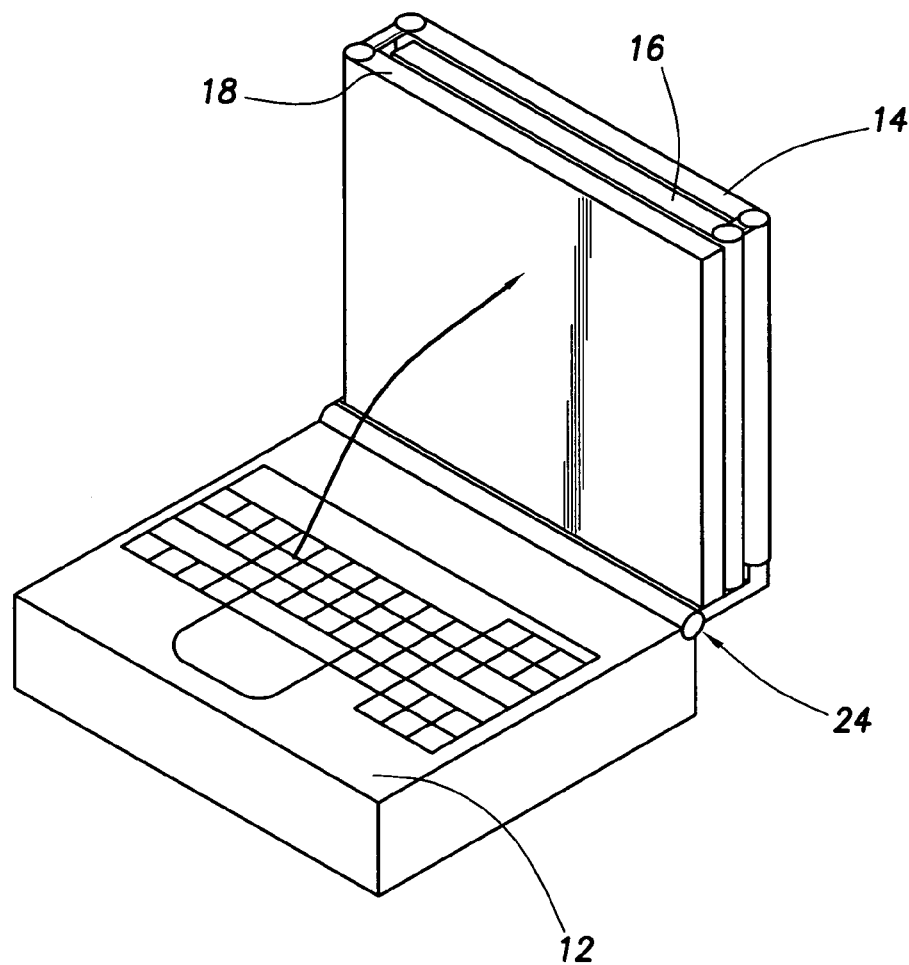
FIG. 3 illustrates an isometric front view of a portable computer system in a first position in accordance with embodiments of the invention.
Figure 5:
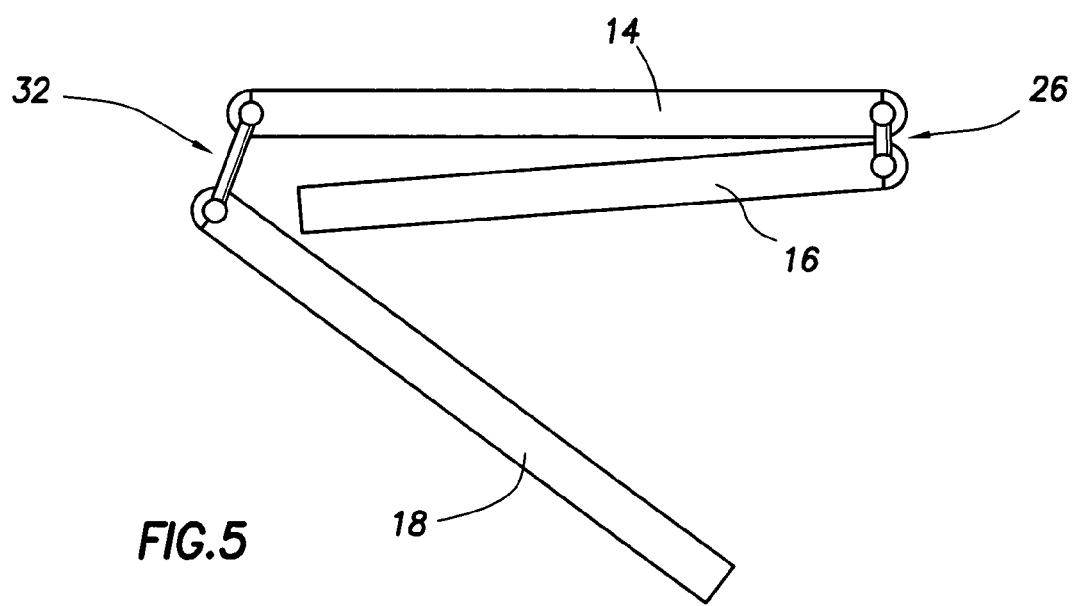
FIG. 5 illustrates a partial top view of a portable computer system illustrating the movement of the displays in accordance with embodiments of the invention.
Figure 4:
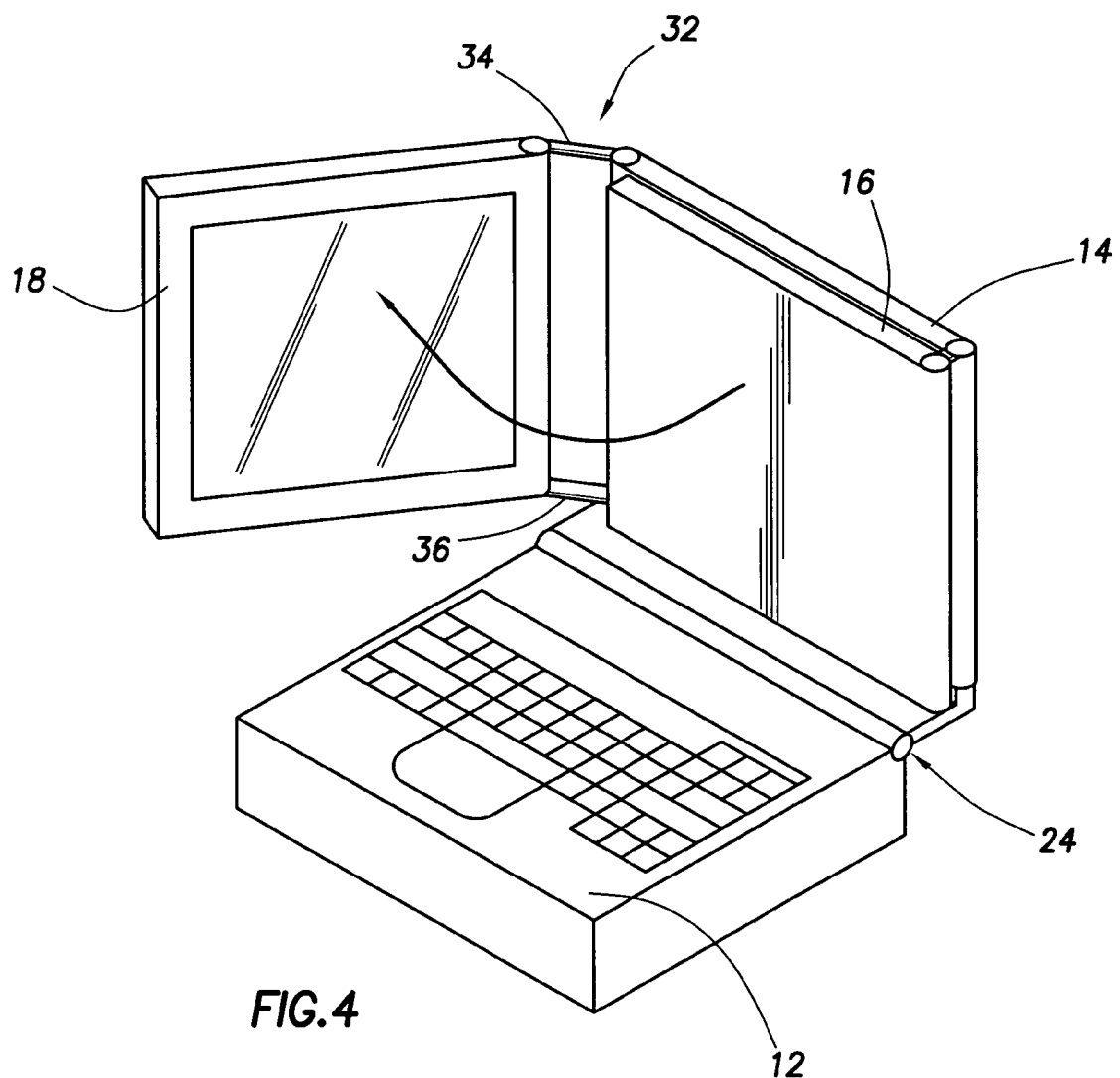
FIG. 4 illustrates an isometric front view of a portable computer system in a second position in accordance with embodiments of the invention.

Referring now to FIG. 3, center display 14 is raised to an upright position and supported by hinge 24. Hinge 24 may be a high torque hinge that supports the weight of all three displays or may have a lock that can be engaged to maintain center display 14 in a raised position. In certain embodiments, a kickstand, or some other external support, may be deployed to support the displays. As shown in FIGS. 4 and 5, once center display 14 is raised, second adjoining display 18 can be rotated away from first adjoining display 16 to a viewing position. First adjoining display 16 can then be rotated to a viewing position as shown in FIG. 1. In this position, the hinged sides, or edges, of the displays are aligned and the displays all face the same general direction.

Figure 6:
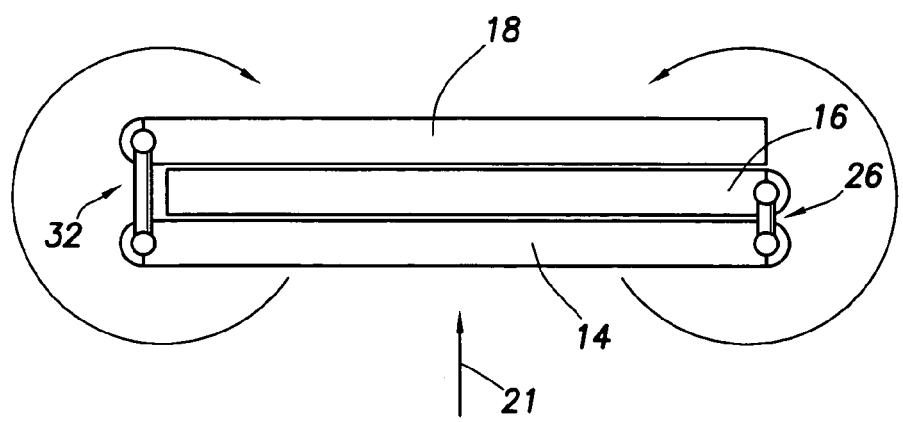
FIG. 6 illustrates a partial top view of a portable computer system positioned for a single display in accordance with embodiments of the invention.
Figure 7:
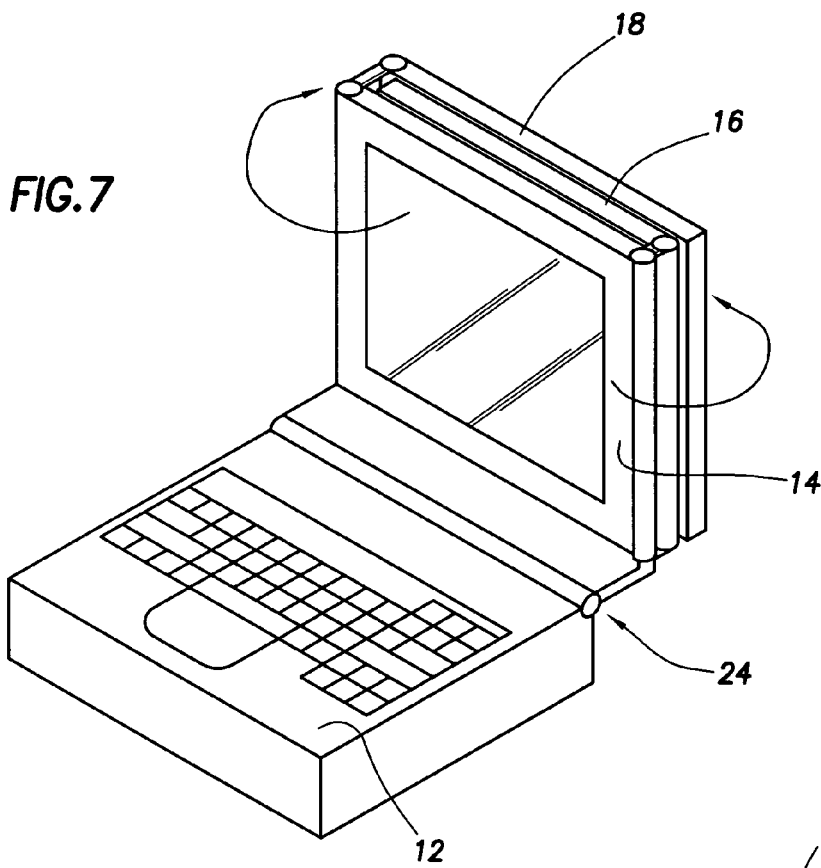
FIG. 7 illustrates a portable computer system in a single display mode in accordance with embodiments of the invention.

The viewing position shown in FIG. 1 is especially suited for a single user viewing three displays simultaneously. Referring now to FIGS. 6 and 7, an alternate viewing position is shown that is especially suited for a single user using a single display for viewing center display 14 in a direction indicated by arrow 21. First adjoining display 16 and second adjoining display 18 are rotated to positions behind center display 14. Hinge assemblies 26 and 32 enable displays 16 and 18 to be rotated to positions behind center display 14 that are similar to their storage positions as shown in FIG. 2. In this position, the hinged sides, or edges, of the displays are aligned but the adjoining displays face the opposite direction of the center display.

Figure 8:
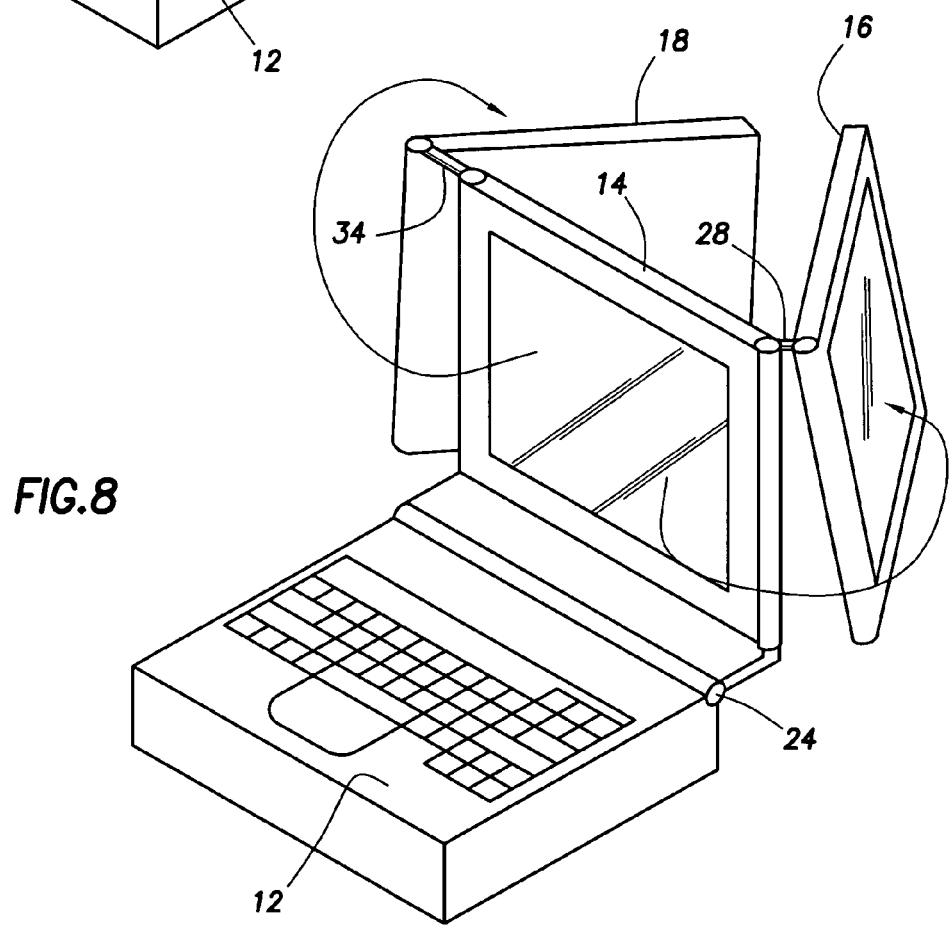
FIG. 8 illustrates an isometric front view of a portable computer system in a presentation mode in accordance with embodiments of the invention.
Figure 9:
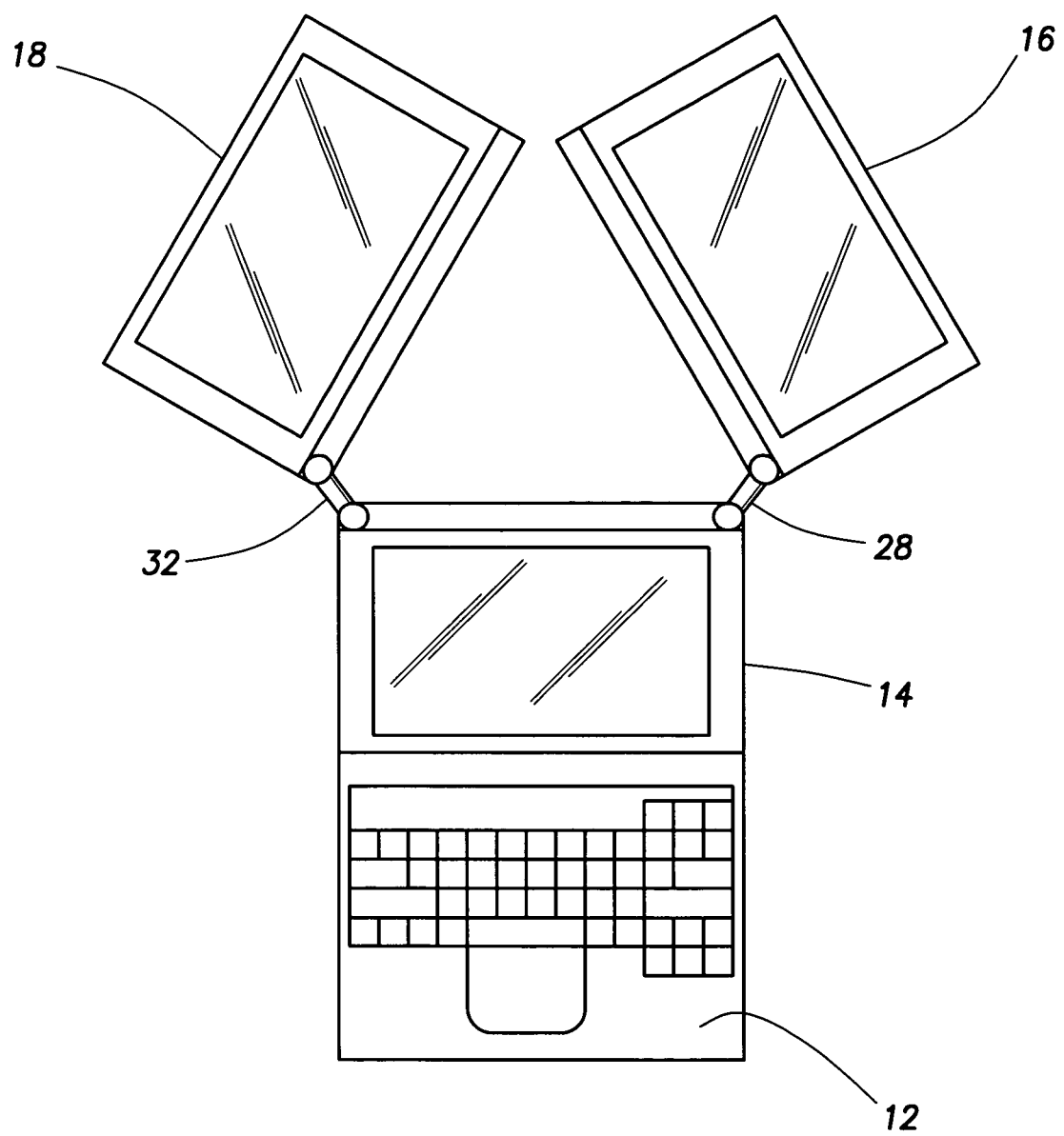
FIG. 9 illustrates an isometric top view of a portable computer system in a presentation mode in accordance with embodiments of the invention.

Referring now to FIGS. 8 and 9, another alternative viewing position is shown that may be used in a presentation mode where the displays are positioned so that either first adjoining display 16 or second adjoining display 18 can be viewed from positions from which the content displayed on center display 14 can not be clearly viewed. Displays 16 and 18 are rotated behind center display 14 to generally form a triangle. Lower hinges 30 and 36 are disconnected in order to adjust the inclination of displays 16 and 18 for easier viewing. Upper hinges 28 and 34 couple displays 16 and 18 to center display 14. The disconnection of lower hinges 28 and 34 enables displays 16 and 18 to adjust to a different angle from the vertical from center display 14. This adjustment makes viewing displays 16 and 18 easier and enables the displays to be moved into a viewable position behind center display 14. In this position, the hinged sides, or edges, of the adjoining displays are oblique to the sides of the center display and each of the displays faces a separate direction.

Figure 10:
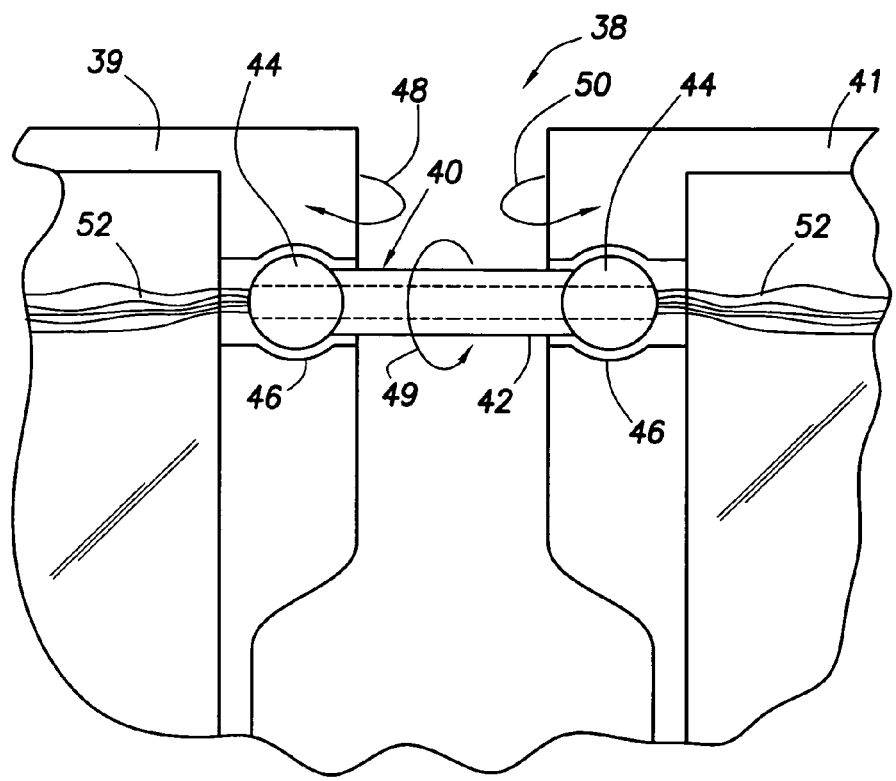
FIG. 10 illustrates an upper hinge assembly in accordance with embodiments of the invention.

One exemplary upper hinge assembly 38 is shown in FIG. 10 connecting stationary display 39 to moveable display 41. Assembly 38 comprises a link member 40 comprising a shaft 42 with a ball 44 disposed on each end. Balls 44 are engaged by sockets 46, which are integrated into displays 39, 41. Sockets 46 enable two-axis rotation of moveable display 41 relative to stationary display 39, as indicated by arrows 48, 49, and 50.

Link member 40 also provides video signals and power from stationary display 39 to moveable display 41. Cables 52 may run through link member 40, providing an electrical connection between the displays. Alternatively, link member 40 may comprise a releasable connector providing an electrical connection while enabling the displays to be disconnected, if desired.

Figure 11:
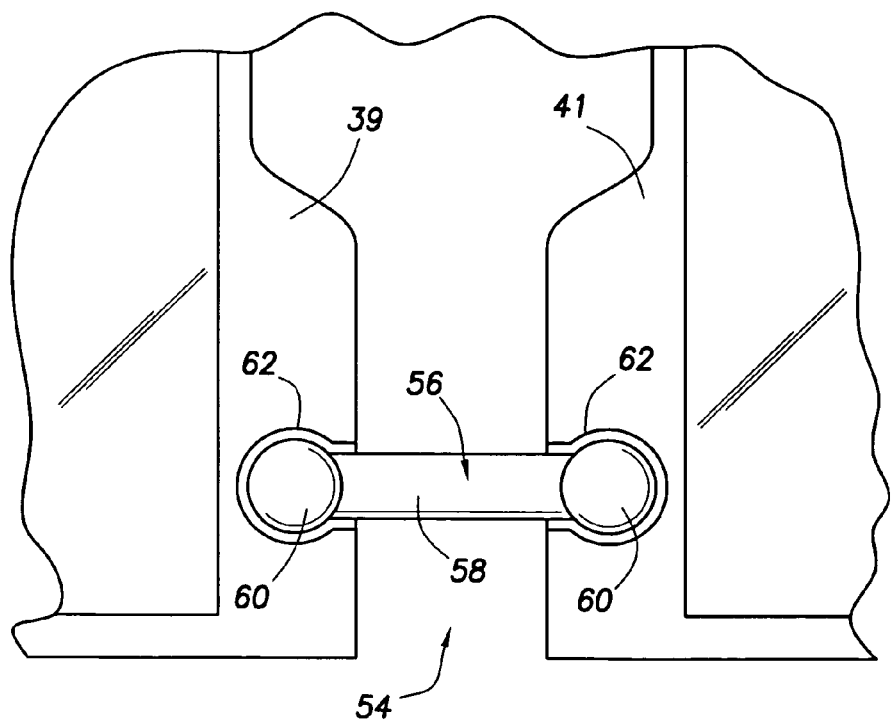
FIG. 11 illustrates a lower hinge assembly in accordance with embodiments of the invention.

One exemplary lower hinge assembly 54 is shown in FIG. 11 coupling stationary display 39 to moveable display 41. Assembly 54 comprises a link member 56 comprising a shaft 58 with a ball 60 disposed on each end. Balls 60 are engaged by sockets 62, which are integrated into displays 39, 41. Sockets 62 enable rotation of moveable display 41 relative to stationary display 39, as indicated by arrow 64. At least one of sockets 62 also enables ball 60 to be removed, thus breaking the connection at lower hinge assembly 54.

Although system 10 utilizes upper hinge assembly 38 in conjunction with lower hinge assembly 54, it is understood that other configurations are possible. For example, two displays could be coupled by a single hinge assembly similar to upper hinge assembly 38. The single hinge assembly may be mounted near the center of the adjoining edge of the displays to provide a centrally located pivot point. The hinge would provide electrical connectivity between the two displays. In certain embodiments, a electrical connector would allow the single hinge assembly to be disassembled so that the displays could be disconnected from the system and stored separately.

Figure 12:
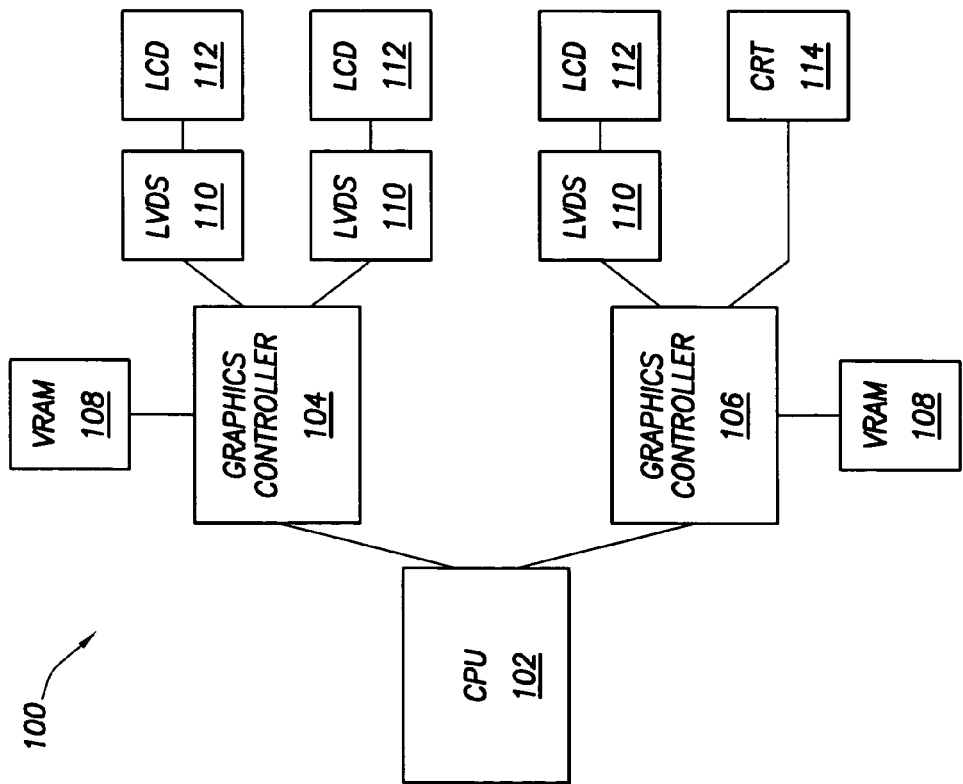
FIG. 12 illustrates, in block diagram form, a video controller in accordance with embodiments of the invention.

Referring now to FIG. 12, one exemplary system 100 for operating multiple displays is shown. System 100 comprises a central processing unit (CPU) 102, graphics controllers 104 and 106, video random access memory (VRAM) 108, low voltage differential signaling (LVDS) transmitters 110, integrated liquid crystal displays (LCD) 112, and external cathode ray tube display device (CRT) 114. CPU 102 provides signals, via an accelerated graphics port (AGP) or a peripheral component interconnect (PCI), to a pair of graphics controllers 104, 106. In the illustrated embodiments, each graphics controller 104, 106 is equipped with video memory 108. Graphics controller 104 is coupled to two LVDS transmitters 110, each of which is coupled to an integrated display 112. Graphics controller 106 has a single LVDS transmitter 110, which is coupled to an integrated display 112, and also supplies an analog signal for use by an external display device 114.

Figure 13:
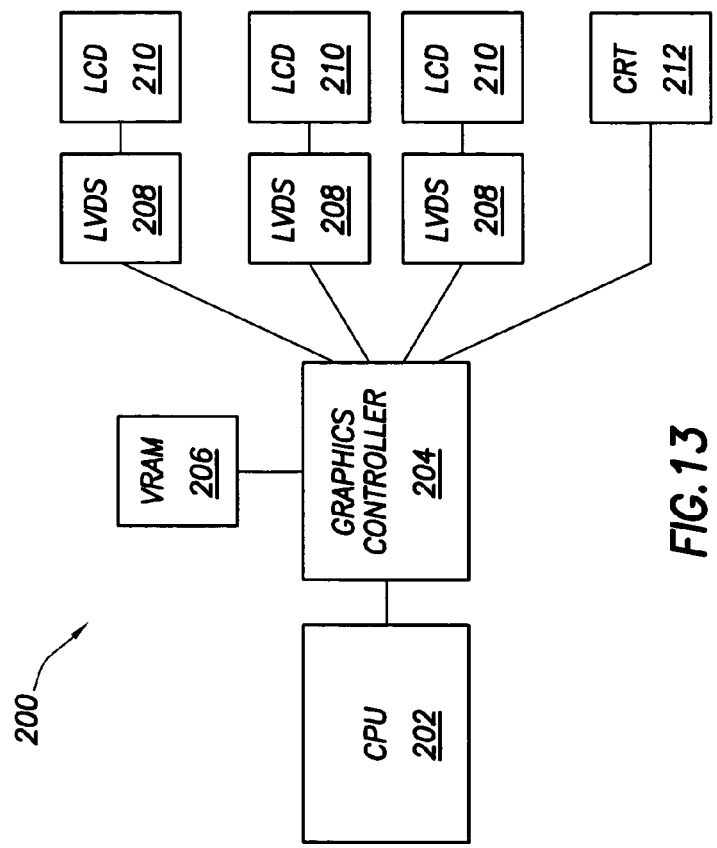
FIG. 13 illustrates, in block diagram form, a video controller in accordance with embodiments of the invention.

Referring now to FIG. 13, an alternate graphics control system 200 is shown. System 200 comprises a central processing unit (CPU) 202, graphics controller 204, video random access memory (VRAM) 206, low voltage differential signaling (LVDS) transmitters 208, integrated liquid crystal displays (LCD) 210, and external cathode ray tube display device (CRT) 212. CPU 202 provides signals, such as by an AGP interface, to graphics controller 204, which supports four video outputs. Graphics controller 204 may be equipped with video memory 206. Graphics controller 204 is coupled to three LVDS transmitters 208, each of which is coupled to an integrated display 210. Graphics controller 204 may also have an output supplying an analog signal for use by an external display device 212.

Either of the above described graphics control systems can be used in conjunction with the three display portable computer system 10, described above. System 10 could be used to display three separate images simultaneously, three identical images simultaneously, or for spreading one image over three displays.

Figure 14:
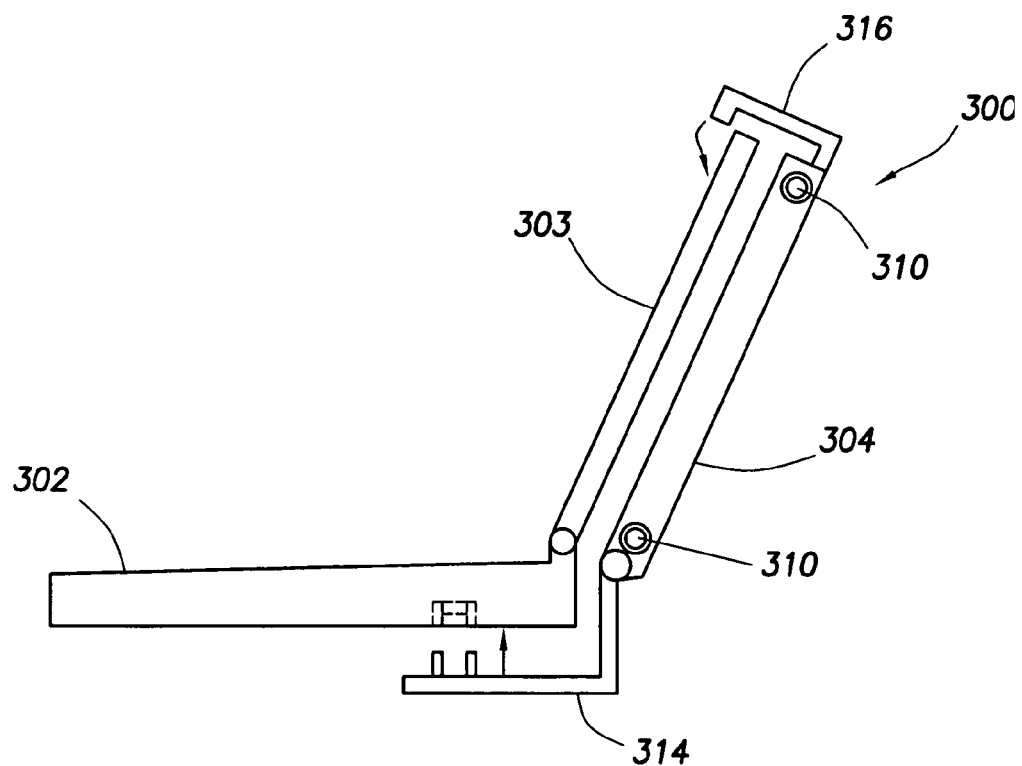
FIG. 14 illustrates an isometric side view of a portable computer system in accordance with embodiments of the invention.
Figure 15:
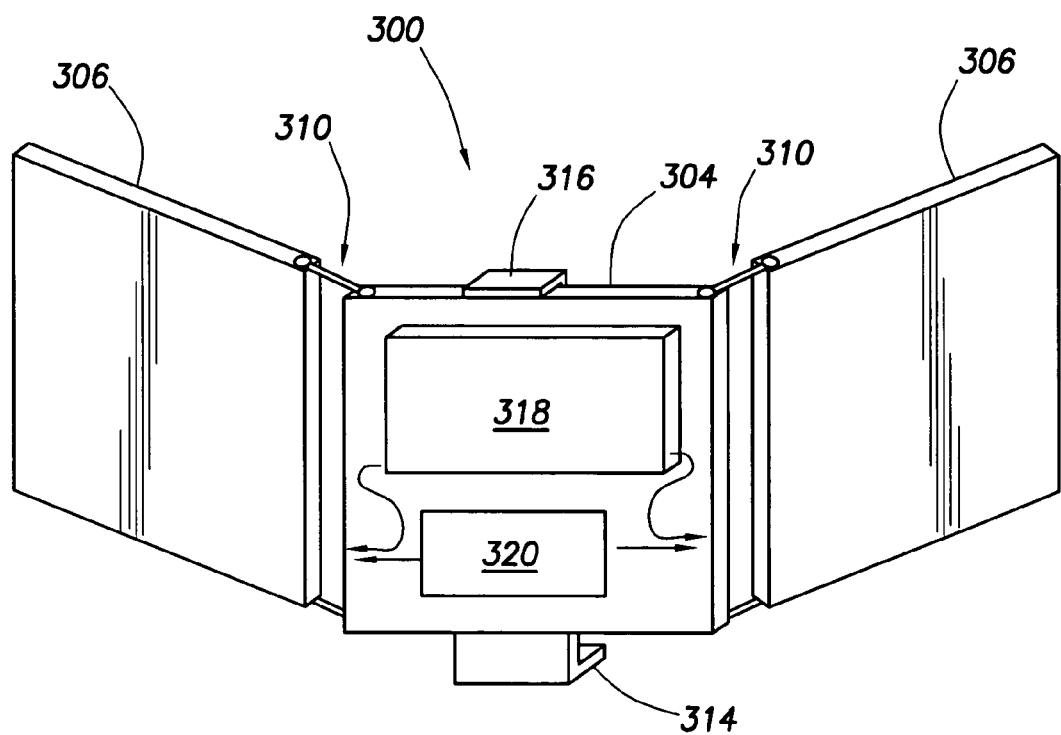
FIG. 15 illustrates an isometric back view of a portable computer system in accordance with embodiments of the invention.

Referring now to FIGS. 14 and 15, an alternate multi-display assembly 300 is shown. Assembly 300 may be installed on a specially configured portable computer system 302, which can be operated as a conventional laptop computer system including single display 303. Assembly 300 is provided as an accessory to computer system 302 that enables the use of multiple displays but allows the assembly 300 to be stored separately from the computer system.

Assembly 300 comprises a support panel 304, side displays 306, hinge assemblies 310, connector 314, and latch 316. Connector 314 connects to the base of computer system 302 and provides an electrical connection that enables the transmission of video signals and power to assembly 300. Latch 316 connects support panel 304 to the top of display 303 in order to secure assembly 300 to system 302. Side displays 306 can be operated in conjunction with display 303 as a multi-display portable computer system. Side displays 306 and hinge assemblies 310 may operate like the displays and hinge assemblies of portable system 10 or may be some other type of hinge arrangement.

Numerous variations and modifications will become apparent to those skilled in the art once the above disclosure is fully appreciated. For example, the principles of the present invention could easily be adapted for use in a desktop or other non-portable computer system. Further, any number of displays could be utilized in systems constructed in accordance with the present invention. Finally, the use of a linked multi-display system should not be construed as limited only to personal computer systems.

What is claimed is:

1. A display apparatus comprising:
a first display comprising a base and a first side extending from the base; and
a second display comprising a first side coupled to the first side of said first display via an upper ball and socket hinge and a lower ball and socket hinge;
said first and second displays have a first position in which the first side of said first display is aligned with the first side of said second display and a second position in which the lower ball and socket hinge is detached so that the first side of said first display is oblique to the first side of said second display;
wherein the upper ball and socket hinge assembly includes a shaft coupled between balls on either end of the shaft and a conduit through the shaft for passage of cables between the first and second displays.

2. The display apparatus of claim 1 further comprising a chassis rotatably mounted to the base of said first display.

3. The display apparatus of claim 1 further comprising:
a third display comprising a first side coupled to a second side of said first display;
said first and third displays have a first position in which the second side of said first display is aligned with the first side of said third display and a second position in which the second side of said first display is oblique to the first side of said third display.

4. The display apparatus of claim 3 wherein said second display has a storage position between said first display and said third display.

5. The display apparatus of claim 1 wherein said second display is operable to rotate relative to said first display about an axis parallel with the first side of said first display when both of the upper and lower ball and socket hinges are attached and about at least one axis not parallel with the first side of said first display when a portion of the lower ball and socket hinge is detached.

6. A computer system comprising;
a chassis;
a center display comprising a base rotatably coupled to said chassis and first and second sides extending from the base;
a first adjoining display comprising a first side coupled to the first side of said center display via a first ball and socket hinge assembly; and
a second adjoining display comprising a first side coupled to the second side of said center display via a second ball and socket hinge assembly, wherein in a first mode, the first side of said center display is aligned with the first side of said first adjoining display and the second side of said center display is aligned with the first side of said second adjoining display, and in a second mode the first and second sides of said center display is oblique to the corresponding first side of said first and second adjoining displays;
wherein each of the first and second ball and socket hinge assemblies includes an upper ball and socket hinge and a lower ball and socket hinge;
wherein each upper ball and socket hinge comprises a shaft coupled between first and second balls, the shaft having a conduit to pass cables between the center display and the corresponding first or second adjoining display;
wherein each lower ball and socket hinge comprise a third ball coupled to a first lower socket and a fourth ball coupled to a second lower socket and a shaft coupled between the third and fourth balls, and wherein at least one of third and fourth balls is to disconnect from the respective socket in the second mode.

7. The computer system of claim 6 wherein said chassis is a portable computer chassis.

8. The computer system of claim 6 wherein the system has a storage position wherein said first adjoining display is folded against the center display and said second adjoining display is folded against the first adjoining display.

9. A method for assembling a portable computer system comprising multiple displays, the method comprising:
connecting a first display to a computer chassis with a hinge assembly; and
connecting one side of a second display to a first side of the first display with a ball and socket hinge assembly comprising upper and lower ball and socket hinges, wherein the ball and socket hinge assembly has a first mode in which the one side of the second display is aligned with the first side of the first display, and a second mode in which said lower hinge disconnects thereby enabling one side of the second display to be oblique to the first side of the first display; and
extending an electrical conductor through a conduit in a shaft of the upper ball and socket hinge.

10. The method of claim 9 further comprising:
connecting one side of a third display to a second side of the first display with a second ball and socket hinge assembly comprising upper and lower ball and socket hinges, wherein the second hinge assembly has a first mode wherein the one side of the third display is aligned with the second side of the first display, and a second mode wherein the one side of the third display is oblique to the second side of the first display.

11. The method of claim 10 wherein the displays have a position wherein the first display faces in the opposite direction of the second and third displays.

12. The method of claim 10 wherein the displays have a position wherein each display faces in a separate direction.

* * * * *

UNITED STATES PATENT AND TRADEMARK OFFICE
CERTIFICATE OF CORRECTION

| | |
|---|---|
| PATENT NO. | : 8,854,278 B2 |
| APPLICATION NO. | : 10/742365 |
| DATED | : October 7, 2014 |
| INVENTOR(S) | : Jeffrey C. Parker et al. |

It is certified that error appears in the above-identified patent and that said Letters Patent is hereby corrected as shown below:

In the Claims

In column 6, line 10, in Claim 6, delete "shalt" and insert -- shaft --, therefor.

Signed and Sealed this
Twenty-fourth Day of February, 2015

Michelle K. Lee
*Deputy Director of the United States Patent and Trademark Office*